Nov. 5, 1968      H. HOPE      3,409,292
MACHINE FOR FEEDING X-RAY FILM OR THE LIKE
Filed Jan. 24, 1967      8 Sheets-Sheet 1

INVENTOR.
HENRY F. HOPE
BY
ATTORNEY

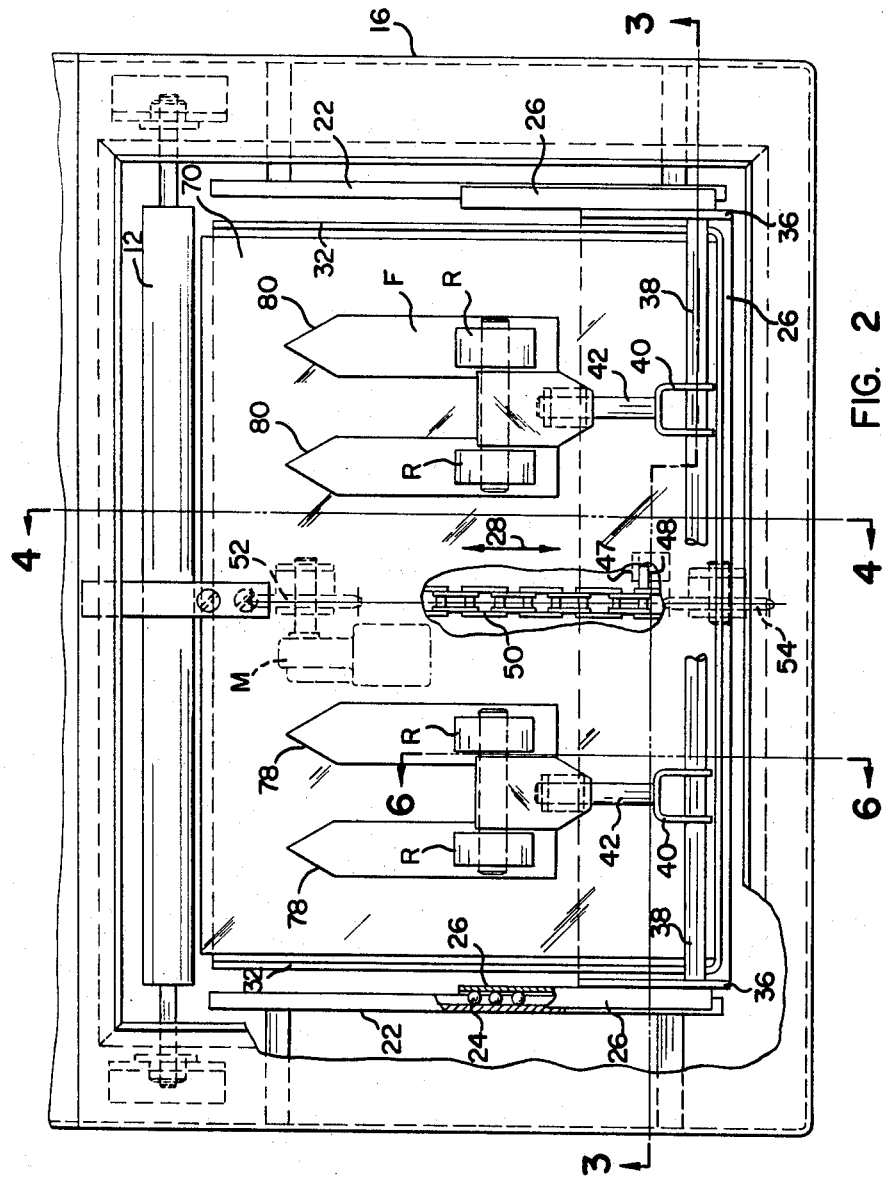

Nov. 5, 1968  H. HOPE  3,409,292
MACHINE FOR FEEDING X-RAY FILM OR THE LIKE
Filed Jan. 24, 1967  8 Sheets-Sheet 3

INVENTOR.
HENRY F. HOPE
BY
ATTORNEY

Nov. 5, 1968 H. HOPE 3,409,292
MACHINE FOR FEEDING X-RAY FILM OR THE LIKE
Filed Jan. 24, 1967 8 Sheets-Sheet 4
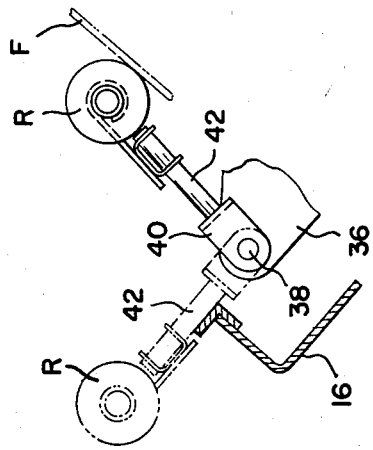
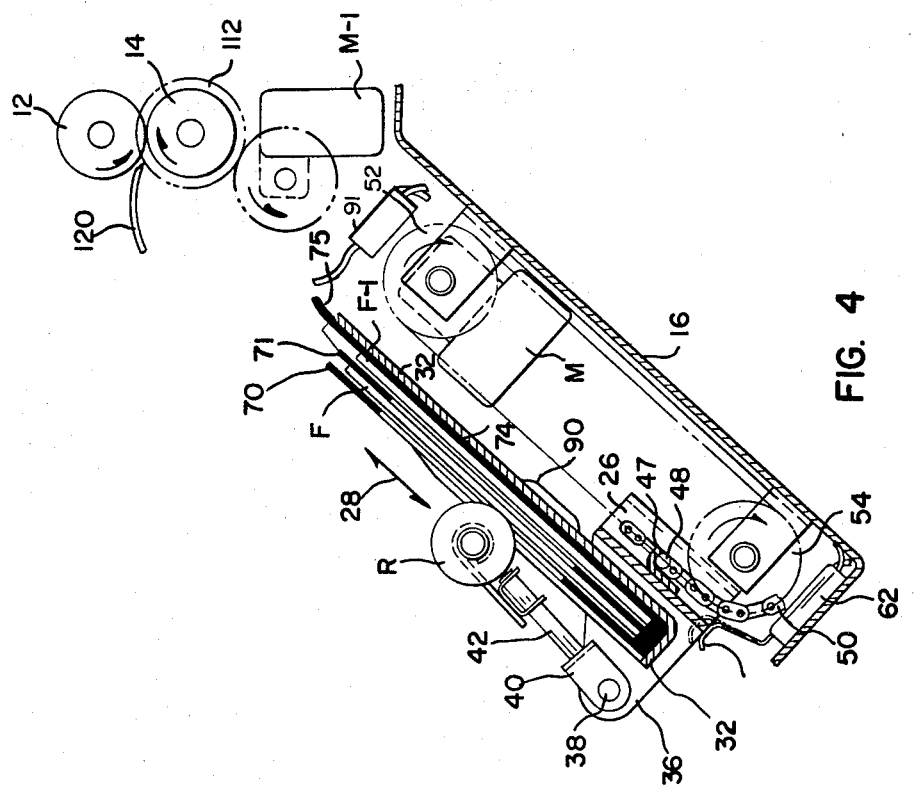
INVENTOR.
HENRY F. HOPE
BY Louis Necho
ATTORNEY

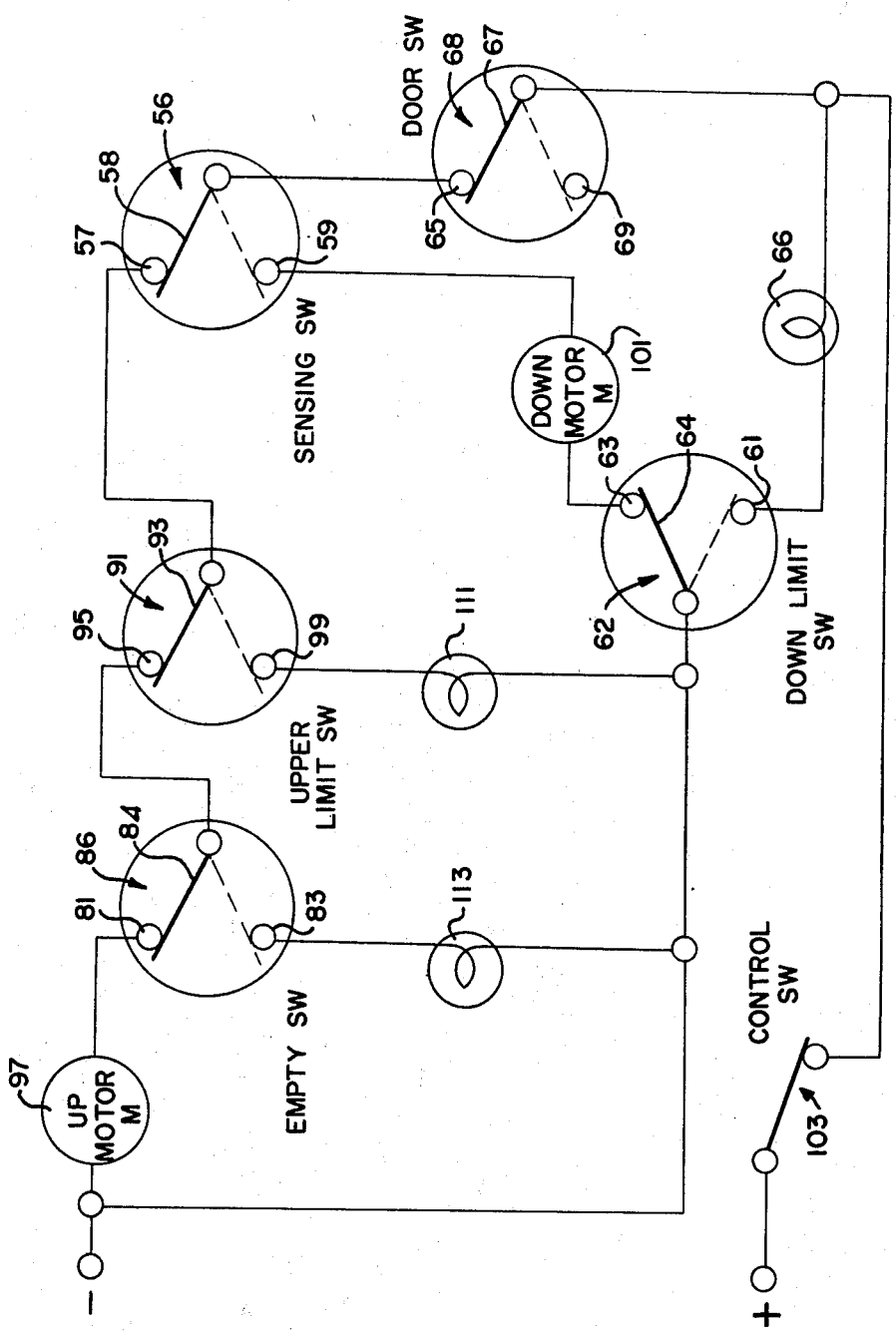

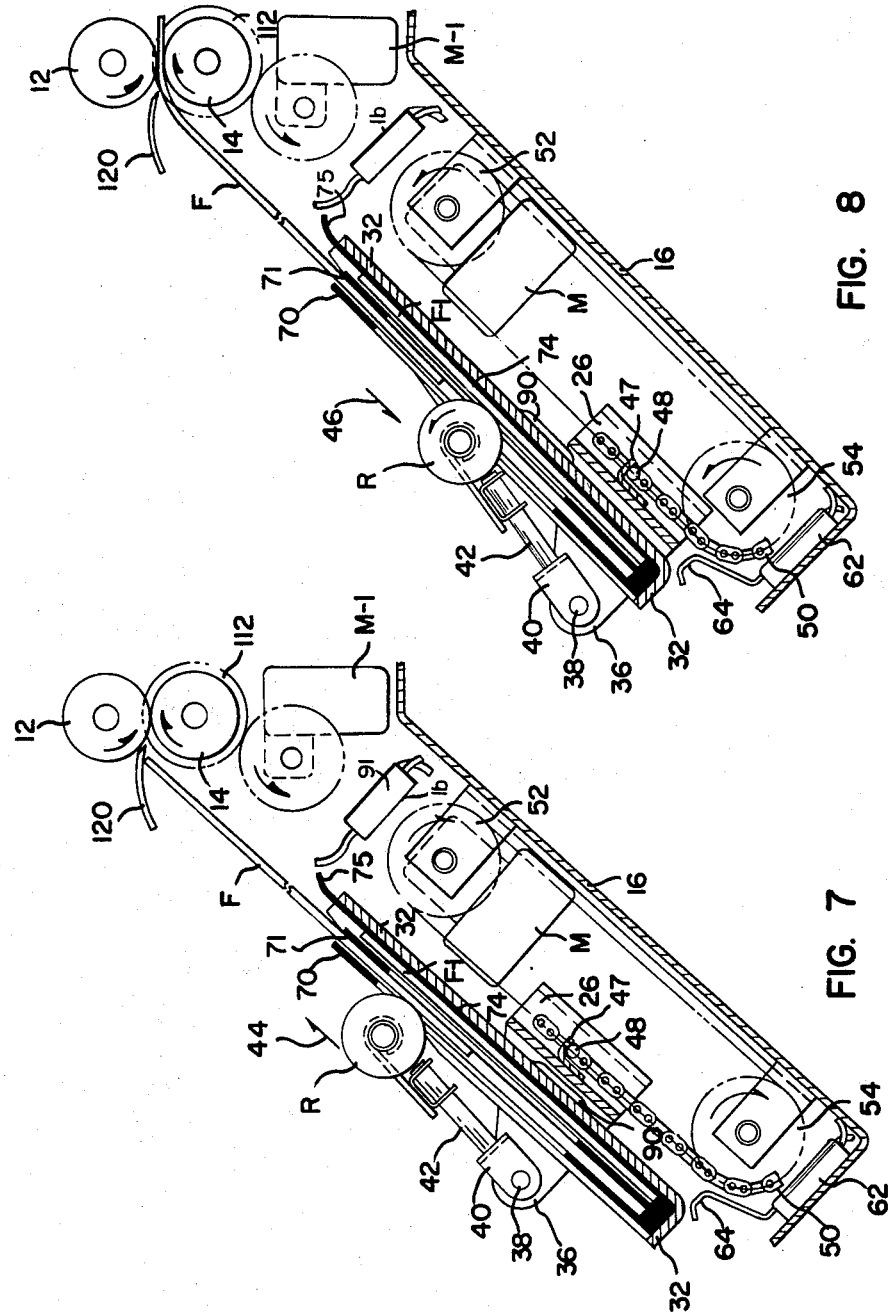

Nov. 5, 1968  H. HOPE  3,409,292
MACHINE FOR FEEDING X-RAY FILM OR THE LIKE
Filed Jan. 24, 1967  8 Sheets-Sheet 7
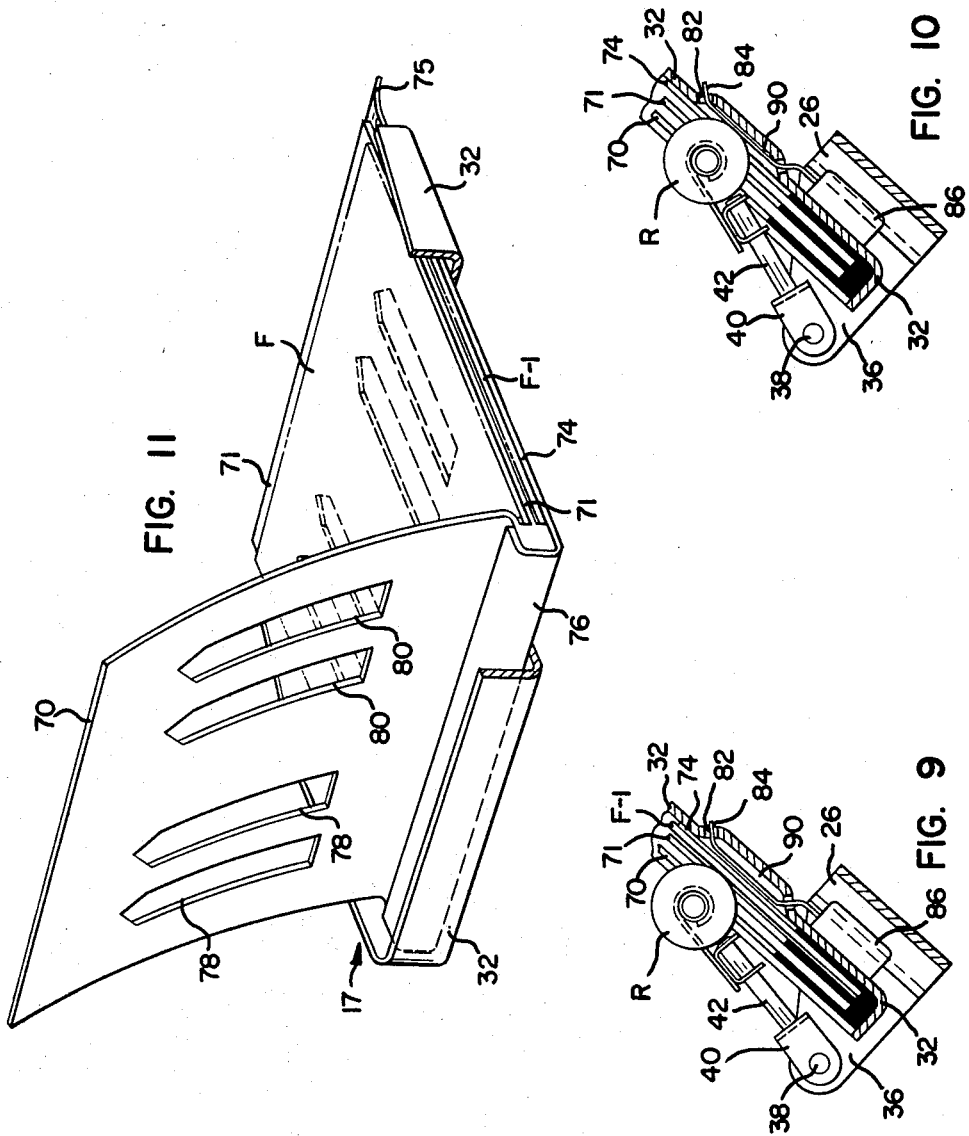
INVENTOR.
HENRY F. HOPE
BY
ATTORNEY

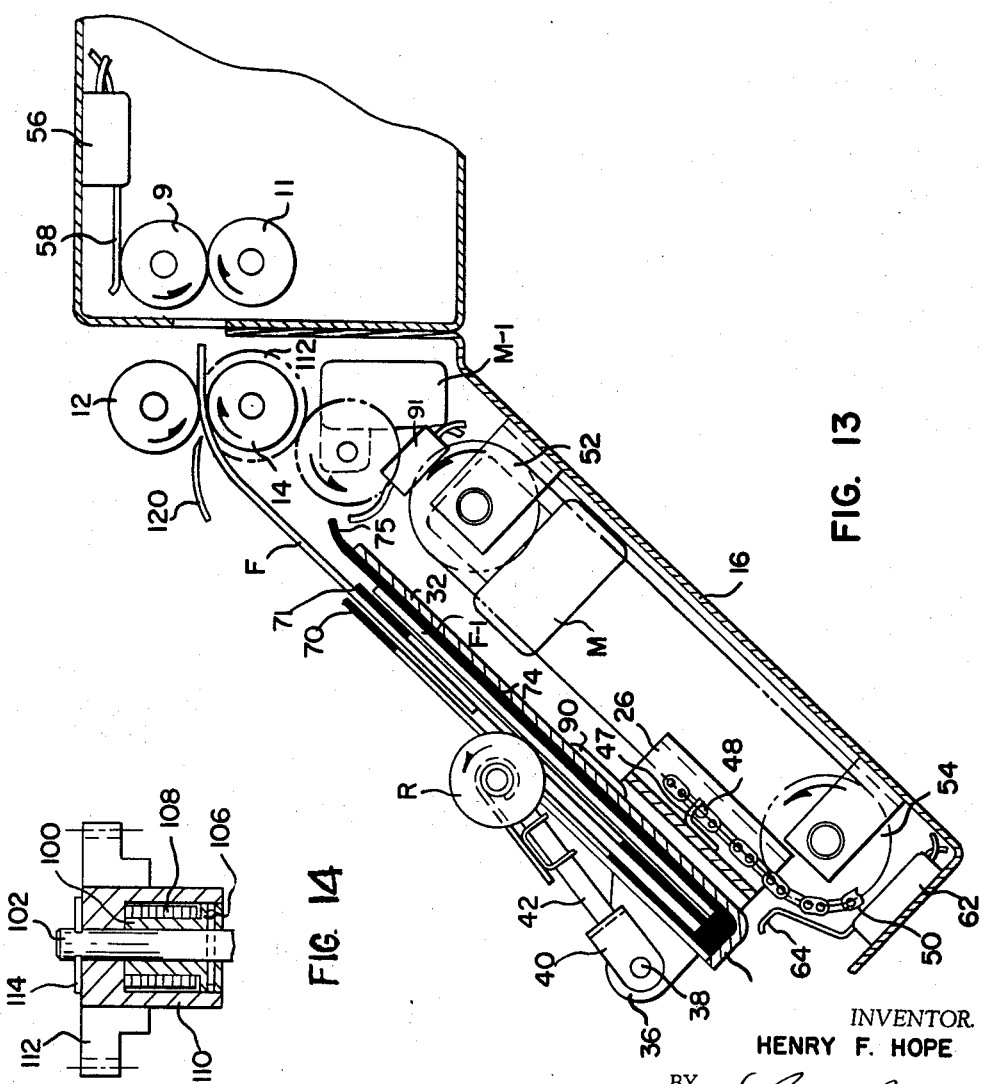

United States Patent Office  3,409,292
Patented Nov. 5, 1968

3,409,292
MACHINE FOR FEEDING X-RAY FILM
OR THE LIKE
Henry Hope, 195 Welsh Road, Huntingdon
Valley, Pa. 19006
Filed Jan. 24, 1967, Ser. No. 611,464
5 Claims. (Cl. 271—10)

ABSTRACT OF THE DISCLOSURE

A machine for receiving an exposed film, or number of films, and feeds them automatically, and one at a time, to a film developing and drying machine.

CROSS REFERENCES

Hope application Ser. No. 427,891, filed Jan. 25, 1965, entitled Machine for Feeding X-Ray Film or the Like, now Pat. No. 3,312,462.

BACKGROUND

The field

Is that of radiology, wherein exposed films must be ready for evaluation as soon as possible.

THE PRIOR ART

Is that cited in the above-identified application.

THE INVENTION

Resides in producing a machine which is compact, durable, inexpensive and wholly automatic, and one which is adaptable for use with any type of known processing machine, and one which can handle films of two different sizes. The machine includes means for synchronizing its operation with the operation of the processor, and includes indicating and safety devices which guard against spoilage, and which permit the introduction of an urgently needed film without having to wait until the feeding machine is empty.

THE DRAWINGS

FIG. 2 is a greatly enlarged plan view looking in the direction of line 2—2 on FIG. 1.

FIG. 4 is a sectional view looking in the direction of line 4—4 on FIG. 2 and showing the machine loaded.

FIG. 5 is a diagram of the circuit which controls the operation of the feeding machine.

FIG. 6 is a view of the lower left-hand corner of FIG. 4 showing, in solid lines, the active position of the film propelling rolls of FIG. 4, and showing, in broken lines, the inactive position of said rolls.

FIG. 7 is similar to FIG. 4 but showing the feeding machine in the act of propelling a film to a pair of nip rolls which form part of a processing machine which is shown in FIG. 1.

FIG. 8 is similar to FIG. 7 but showing the feeding machine during the return stroke.

FIG. 9 is a sectional view looking in the direction of line 9—9 on FIG. 2 and showing the parts as they appear when the feeding machine is propelling the last film.

FIG. 10 is similar to FIG. 9 but showing the position of the parts when the feeding machine is empty.

FIG. 11 is a perspective view showing the X-ray film storing magazine.

FIG. 13 is a sectional view, similar to FIG. 4, but showing the feeder of my invention connected to the intake end of a film processing machine.

FIG. 14 is a fragmentary sectional view showing a slip clutch which forms part of the construction.

Figure 1:
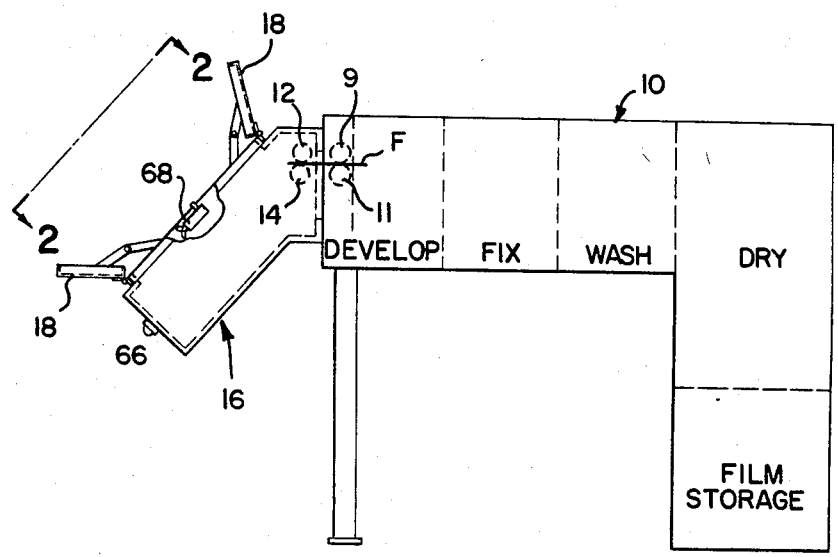
FIG. 1 is a diagrammatic elevational view showing an X-ray film feeding machine of my invention coupled to an existing automatic X-ray film developing, fixing, washing and drying machine.
Figure 12:
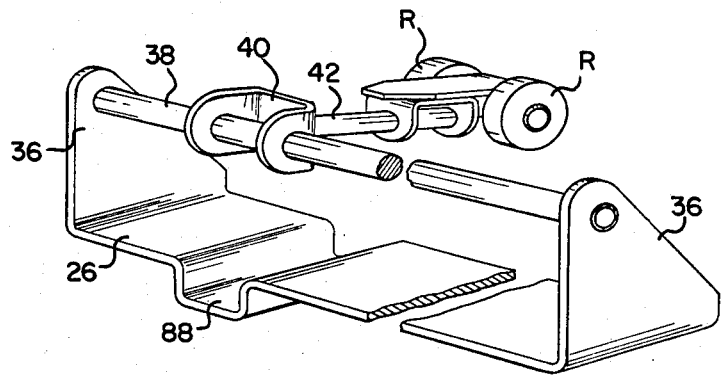
FIG. 12 is a perspective view showing the film propelling mechanism shown detached.

In FIG. 1 there is shown an automatic X-ray processing machine 10 while may be of the type disclosed in my Patent Number 3,241,473 of Mar. 22, 1966, entitled Machine for Processing X-Ray Film or the Like. Such a machine will include a film developing section; a film fixing section; a film washing section; and a film dryer which dries and deposits the dried films in an accessible storage and delivery compartment. Such a processor also includes means, not shown, for carrying the film through the various sections of the processor and delivers it to the dryer. Since the processor forms no part of the present invention, it is not shown nor described. It is sufficient to point out that the processing machine includes a pair of film receiving and advancing nip rolls 9 and 11 which are rotated continuously and at a fixed rate of speed, as long as the machine is in operation. It should be noted that film receiving rolls 9 and 11 are driven synchronously with the operation of the film processor so as to be adapted to receive a film F fed to it by rolls 12 and 14 of the feeder of this invention and to propel it into the developing section of the processor. In other words, the feeding machine of the present invention, is only concerned with receiving one film or a stack of films and delivering them to X-ray film processor 10. For reasons which will appear below, upper roll 9 is mounted for free vertical movement relative to roll 10.

The structure of the automatic film receiving and feeding machine of my invention is best shown in FIGS. 3, 4, 7, and 8, from which it will be seen that all of the parts are enclosed in a fixed outer casing 16, which is provided with hinged, light-excluding door, or door 18, FIG. 1, which is opened for loading, unloading, or inspection, but which is closed when the feeding machine is in operation.

Casing 16 carries fixed side brackets 22 which carry ball bearings 24 on which movable carriage 26 is adapted to reciprocate, as indicated by the double headed arrow 28 in FIGS. 2 and 4, in the manner and for the purpose hereinafter set forth.

Figure 3:
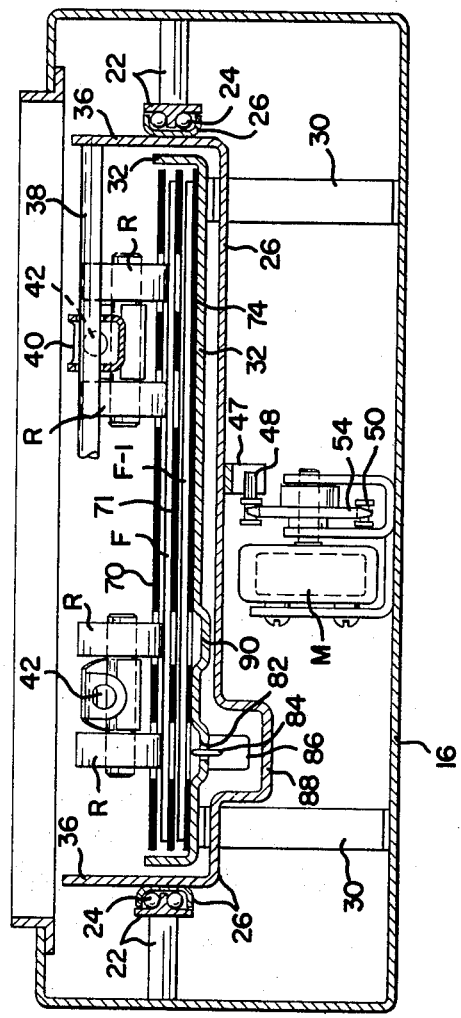
FIG. 3 is a sectional view looking in the direction of line 3—3 on FIG. 2.

Casing 16 also carries uprights 30, FIG. 3, which support a stationary tray 32 which is adapted to receive a film, or the film storing magazine 17 of FIG. 11 which contains a number of superimposed exposed films F, F-1, etc.

Carriage 26 carries vertical ears 36 which carry a fixed shaft 38 on which are freely rotatable U-shaped brackets 40 which pivotally carry arms 42 which carry one-way friction rolls R. By this arrangement, arms 42 and rolls R may be moved to the solid, or to the broken, line position of FIG. 6 for the purpose hereinafter set forth.

Friction rolls R are adapted to lock when carriage 26 is moved upwardly, or in the direction of arrow 44 in FIG. 7 and are adapted to rotate freely, when the carriage is moved downwardly, or in the direction of arrow 46 in FIG. 8. Since one-way rolls are available on the market and since they do not, as such, form part of the present invention, they are not shown, nor described. But, for convenience, reference may be had to Patent 3,032,914, Patent 2,070,698, and Patent 2,038,987, all of which show one-way rotation. It is sufficient for the purpose of this invention to say that rolls R do not rotate while the carriage 26 moves up, so as to push a film into the nip of rolls 12 and 14, and that the rolls rotate freely while the carriage 26 moves down, so as not to exert any pull on the film therebeneath.

Carriage 26 is reciprocated relative to fixed tray 32 by means of a pendent lug 47 which is engageable with a pin 48 which is carried by sprocket chain 50 which travels over sprockets 52 and 54. Chain 50 is actuated in alternate directions by motor M.

Rolls R are also mounted for free, lost motion relative to arms 42 which also have free lost motion relative to brackets 40 and shaft 38 whereby rolls R will bear on the film with their own weight and whereby they will be self-adjusting relative to the film therebelow. When pin 48 is moved forward, or in the direction of arrow 44, it engages lug 47 and moves carriage 26 and rolls R toward nip rolls 12 and 14. When pin 48 moves back, or in the direction of arrow 46, it acts as a pacer for the carriage, that is, it limits the speed of the carriage on its return stroke to the speed of the pin. By this arrangement the reciprocal movement of the carriage is controlled and the carriage will stop when the pin stops, thereby insuring quiet operation as distinguished from an operation in which the carriage is allowed to accelerate until it comes to rest with a bang against a fixed stop. The detachable engagement of pin 48 with lug 47 provides a safety feature in that if, for any reason, the motor should not reverse, pin 48, following the curvature of sprocket 52 will be automatically disengaged from lug 47 and will prevent serious damage to the parts.

In an early prototype, the films were stacked on tray 32, one on top of another, and it was found that an upper film being pushed toward nip rolls 12 and 14, by rolls R, tended to drag the film therebeneath, with the result that two, or more, films were pushed into the nip of rolls 12 and 14 simultaneously. To overcome this difficulty, I devised the magazine which is best shown in FIG. 11 and which consists of a number of spacer sheets 70, 71, etc., which rest on a base plate 74 and the edges of which are found in channel 76. Sheets 70, 71, etc. are provided with spaced openings 78 and 80 and may be turned, like the leaves of a book, or as shown in FIG. 11, so as to receive X-ray films F, F-1, etc., therebetween. The exit edge of base 74 is bent down as at 75 to facilitate the passage of the films thereover.

While in the drawings I have shown only two films F and F-1, and a magazine having only two spacer sheets 70 and 71, it is to be understood that the magazine can have as many as a dozen or more spacer sheets, for receiving a corresponding number of films. It will be noted that rolls R will have access to the successive films F, through openings 78 and 80 in the successive spacer sheets. Since successive films are separated from each other by the intervening spacer sheets, the propulsion of a film F below spacer sheet 70 by rolls R will not in any way affect a film F-1 below spacer sheet 71 and so on down until the last film, below the last spacer sheet, has been propelled out of the magazine.

In order to stop the machine in the absence of any film in the feeding machine, I provide fixed tray 32 with a slot 82 through which projects the switch arm 84 of a normally closed switch 86, which is housed in a well 88 which depends from carriage 26. Switch arm 84 is located in a depression 90 so as to be below the upper surface of tray 32. By this arrangement, as long as there is any film on fixed tray 32, or in the magazine, the roll R which registers with slot 82 will be unable to reach switch arm 84. But, as soon as the last film has been ejected, one of rolls R, due to the lost motion previously described, will drop into recess 90, and will depress switch arm 84 to deenergize motor M. This and other switches will be described in connection with the circuitry shown in FIG. 5. To reload an empty magazine, or to replace it with a loaded one, arms 42 are moved to the out-of-the-way position as shown in phantom in FIG. 6.

Film advancing rolls 12 and 14 are driven constantly and at a fixed rate, by a separate motor M-1. But, for reasons which will appear below, these rolls are driven by a slip clutch so that they may be rotated independently of motor M-1. The slip clutch may be of any conventional type but, for convenience, it may take the form diagrammatically shown in FIG. 14. As can be seen from this figure, the slip clutch includes a sleeve 100, which is keyed to the shaft 102 of independently energized and constantly running motor M-1. Sleeve 100 has a rim 106 to which is secured one end of a spring 108, the other end of which is free. Enclosing the sleeve and the spring is a cap 110 which carries a gear 112 which meshes with a pinion, not shown, on the shaft of roll 14. Cap 110 is freely rotatable relative to motor shaft 102 but is prevented from axial movement by retainer 114. By this arrangement if a film is pushed into rolls 12 and 14 rapidly, it accelerates rotation of the rolls and prevents buckling. If a film is pushed in slowly, its movement will be accelerated by the rolls and prevents lagging.

The parts thus far described are actuated, in a predetermined sequence by the circuitry diagrammatically shown in FIG. 5 from which it will be seen that motor M is energized to rotate in one direction, or the other, by two-position sensing switch 56 which responds to the presence or absence of a film between rolls 9 and 11 of the processing machine.

Switch 56 has a switch arm 58 which engages contact 57 when there is no film between rolls 9 and 11 and completes circuit 97 which energizes the motor to move carriage 26 upwardly, or in the direction of arrow 44 in FIG. 7. Switch 56 also has contact 59 which is engaged by switch arm 58 in the presence of a film between rolls 9 and 11 so as to complete circuit 101 which energizes motor M to move carriage 26 downwardly, in the direction of arrow 46 in FIG. 8. As illustrated, switch 56 is associated with rolls 9 and 11 which are part of the processing machine, in that they receive a film from rolls 12 and 14, or other external source, and deliver to the developing tank or section, of the processor. For use with a processing machine which does not have receiving rolls 9 and 11, switch 56 can be associated with rolls 12 and 14 as shown in the Hope application aforesaid.

The circuitry which controls the operation of the feeding machine is illustrated in FIG. 5, and it operates as follows:

The absence of a film between rolls 9 and 11 moves switch arm 58 into engagement with contact 57. This energizes the circuit 97 of the "up" side of motor M and moves carriage 26 upwardly, FIG. 7, whereby rolls R push a film into the nip of advancing rolls 12 and 14. But, as soon as a film enters between rolls 9 and 11, roll 9 moves switch arm 58 into engagement with contact 59 of switch 56. This breaks the circuit 97 of the "up" side of the motor and, as later explained, it energizes the circuit 101 of the "down" side of the motor to move carriage 26 downwardly, FIG. 8.

In advance of reversing switch 56 is a two-position door switch 68, the arm 67 of which is selectively engageable with contact 65 which is in series with contact 57, or with contact 69, which will be further referred to.

Next to switch 56 is a two-position "upper limit" switch 91, the arm 93 of which is engageable with contact 95, which is in series with contact 57, or with contact 99 which is also further referred to. Between the circuit 97 of the "up" side of the motor and upper limit switch 91 is a two-position "empty" switch 86, the arm 85 of which selectively engages contact 81 which is in series with contact 95, or with contact 83 which will be hereinafter referred to.

It will be seen that switches 68, 56, 91, and 86 are in series, and that opening any one of them will break circuit 97 which energizes the motor to move carriage 26 upwardly.

Circuits 97 and 101 may be in the nature of separate windings of motor M, or they may be in the nature of separate motors.

When the switch arms of switches 68, 56, 91, and 86 are in their solid line positions, the circuit 97 of the "up" side of the motor will be energized and the carriage 26 will move upwardly. If switch 68 is opened by opening door 18, or if switch 56 is opened by the absence of a film between rolls 9 and 11; or if upper limit switch 91 is opened by the movement of carriage 26, as hereinafter described; or if empty switch 86 is opened by roll R, circuit 97 of the "up" side of the motor will be broken.

If arm 58 is in engagement with contact 59 and if arm 61 is in engagement with contact 63, and if switch arm 67 is in engagement with contact 65, the circuit 101 of the "down" side of the motor will be completed and carriage 26 will move downwardly to the position shown in FIG. 8. If switch 68 is opened by opening door 18, or if switch arm 64 is moved into engagement with contact 61 by the movement of carriage 26 to the position of FIG. 4, the circuit 101 of the "down" side of the motor will be de-energized.

Movement of arm 64 into engagement with contact 61 lights lamp 66 to indicate that the door may be opened for the introduction of additional films or for inspection.

Movement of switch arm 84 into engagement with contact 83, lights lamp 113 to indicate that there is not one film left on tray 32. Movement of switch arm 93 into engagement with contact 99 lights lamp 111 which indicates that upper limit switch 93 is open. This contingency will be further referred to.

The entire circuit can be broken by opening control switch 103.

X-ray films come in a large size for photographing the entire chest, or in a small size for photographing the stomach or some other restricted area. When a large size is used, its leading edge reaches, and moves, switch arm 58 out of engagement with contact 57, before carriage 26 has reached switch 91. This interrupts circuit 97 and arrests the upward movement of the carriage. Preferably a conventional time delay device is included in switch 36 so that a second or two will elapse before arm 58 engages contact 59 to energize the "down" circuit 101 which moves carriage downwardly to begin a new cycle. This permits a large film to clear rolls 12 and 14 before the lead edge of a subsequent film reaches these rolls.

When a small size film is used, carriage 26 travels up far enough to reach switch 91 and to move its arm 93 out of engagement with contact 95 before, or substantially simultaneously, with the arrival of the lead edge of a small film at rolls 9 and 11. By expediting the movement of a small film, this arrangement minimizes the gap between successive films.

A large film will be engaged by rolls 12 and 14 well before its trailing end clears rolls R (even with the limited upward travel of carriage 26) and until its leading edge is engaged by rolls 9 and 11. This insures that the film will travel "square," that is, it will not go askew.

In the case of a small film, the upward travel of carriage 26, until it reaches upper limit switch 91, insures that a small film will continue to be held down by rolls R—and by rolls 12 and 14—until its leading edge enters, or is about to enter rolls 9 and 11.

Due to the opening of switch 91 by carriage 26, lamp 111 will be energized by the passage of every small film, but it will stay lit only long enough for the lead edge of the film to move switch arm 58 into engagement with contact 59. Again, a time lag can be provided if desired. Therefore, "off" and "on" flashing of lamp 111 can be ignored. But, if lamp 111 stays lit for more than the preset interval, it will serve as a warning that a film is jammed up, or that something else is wrong.

To minimize the time gap between films which results when a mixture of small and large films are to be fed indiscriminately to avoid the necessity of adjusting the machine for each size, carriage 16 must impart to the film greater linear speed than that at which rolls 12 and 14 would propel it under the influence of motor M–1. To this end, rolls 12 and 14 are connected to uniform speed motor M–1 through the above-described slip clutch of FIG. 14. By this arrangement, a film pushed into rolls 12 and 14 too fast will overdrive or accelerate them instead of buckling; a film pushed into the rolls 12 and 14 at the speed of rotation of the rolls will neither accelerate, nor decelerate them; a film pushed into rolls 12 and 14 at a speed lower than the speed of the rolls will be accelerated up to their rate of rotation, and a film pulled out of rolls 12 and 14 at a higher speed will again accelerate the rolls and will avoid damage to the film.

To minimize contact of the face of a film with guide rolls, or the like, I provide the inverted arcuate guide member 120 which is located between carriage 26 and rolls 12 and 14 and, if desired, a similar guide can be used between rolls 12 and 14 and rolls 9 and 11. As can be seen from FIG. 13, this guide member receives the leading edge of a film and directs it to the nip of the rolls, while minimizing surface contact.

This application is a continuation in part of the cross reference application.

What I claim is:

1. A machine for feeding X-ray film, or the like, including:
   a film support,
   a pusher roll engageable with a film on said support,
   means mounting said pusher roll for reciprocation relative to said support to push a film off said support,
   a reversing motor for reciprocating said pusher roll at a constant speed,
   a pair of nip rolls located in the path of movement of said pusher roll for receiving a film fed therebetween by said push roll,
   a motor for rotating said nip rolls at a different constant speed, and
   a slip clutch connecting said motor to one of said nip rolls whereby said rolls may be selectively rotated at the speed of said second motor or at the speed imparted to the film by said reversing motor.

2. The machine defined in claim 1 and a second pair of nip rolls located in the path of movement of a film passing between the first mentioned pair of nip rolls for receiving and advancing a film leaving said first mentioned pair of nip rolls;
   a switch having a switch arm which is movable to a first position by the absence of a film between said second pair of nip rolls, and to a second position by the presence of a film between said second pair of nip rolls, and
   means connecting said positions of said arm to the opposite sides, respectively, of said reversing motor whereby movement of said switch arm to said first position energizes the side of the motor which moves said pusher roll in the direction to feed a film to said first mentioned nip rolls, and whereby movement of said switch arm to its second position energizes the side of the motor to move said pusher roll in the opposite direction.

3. A machine for feeding films of different sizes including a first pair of film receiving and advancing nip rolls;
   a first motor for rotating said first pair of rolls at a constant speed to propel a film therebetween at a first predetermined linear speed,
   a fixed film support,
   a second pair of film receiving and advancing nip rolls located between said support and said first pair of rolls,
   a carriage mounted for movement, above said support, in a first direction toward said second pair of nip rolls and in a second, opposite direction away from said nip rolls,
   a film engaging element carried by said carriage and operative, upon movement of said carriage in said first direction, to push a film on said support into said second pair of rolls,
   a second, reversing, constant-speed motor for reciprocating said carriage at a speed calculated to push a film into said second pair of rolls at a linear speed greater than said first predetermined speed, a third, constant speed motor, and a slip clutch connecting said third motor to one of said second pair of rolls will have a linear speed which is equal to the linear speed imparted by said element, or to the linear speed imparted to the film by said second pair of rolls, or to the speed imparted to a film while passing through the first and second pairs of rolls simultaneously.

4. The combination with:

a first pair of nip rolls adapted to receive a film therebetween and to propel it at a predetermined linear speed, a film feeding mechanism for delivering a film to said first pair of rolls at a constant linear speed which is compatible with said predetermined speed, said mechanism including a film support, a carriage mounted for reciprocal movement relative to said support, a pusher carried by said carriage and engageable with said film, a second pair of film receiving and advancing rolls 12 and 14 intermediate said first pair of rolls and said support, a first motor 97 for moving said carriage and said pusher in a first direction to move a film from said support into said second pair of rolls at a second linear speed greater than said predetermined speed, a second motor 101 for moving the carriage and the pusher in the reverse direction, a first switch operable by the absence of a film between said first pair of rolls to energize said first motor and operable by the presence of a film between said first pair of rolls to energize said second motor to effect controlled reciprocation of said pusher, a second, normally closed limit switch 91 included in the circuit of said first motor and located in the path of movement of, and adapted to be opened by, the movement of said carriage under the influence of said first motor to de-energize the same, a third, normally closed, switch included in the circuit of said second motor and adapted to be opened in the absence of any film on said support to de-energize said second motor, a fourth, normally open switch included in the circuit of said second motor and adapted to be opened by movement of the carriage in said reverse direction to de-energize said second motor, a casing enclosing said carriage and said film support and having a hinged light-excluding access door, and a fifth switch adapted to be closed by the closing of said door and to be opened by the opening of said door, said fifth switch being included in the circuit of said second and third motors to de-energize both motors upon opening of said door.

5. The combination set forth in claim 4, and signal associated with said switches for indicating the status thereof, respectively.

References Cited

UNITED STATES PATENTS

| | | | |
|---|---|---|---|
| 2,569,387 | 9/1951 | Robinson | 271—42 |
| 2,896,944 | 7/1959 | Shiba | 271—57 |
| 3,265,383 | 8/1966 | Shute | 271—11 |
| 3,287,012 | 11/1966 | Woodcock | 271—57 |

RICHARD E. AEGERTER, *Primary Examiner.*